(12) United States Patent
Nebout et al.

(10) Patent No.: US 10,254,555 B2
(45) Date of Patent: Apr. 9, 2019

(54) DASHBOARD EMBEDDED HOLOGRAM-BASED INDICIA

(71) Applicant: VISTEON GLOBAL TECHNOLOGIES, INC., Van Buren Township, MI (US)

(72) Inventors: Patrick Nebout, Van Buren Township, MI (US); Benoit Chauveau, Van Buren Township, MI (US); Remi Sigrist, Van Buren Township, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 0 days.

(21) Appl. No.: 15/660,418

(22) Filed: Jul. 26, 2017

(65) Prior Publication Data

US 2019/0033610 A1    Jan. 31, 2019

(51) Int. Cl.
| | |
|---|---|
| *F21V 7/00* | (2006.01) |
| *F21V 7/04* | (2006.01) |
| *B60K 37/02* | (2006.01) |
| *F21S 43/31* | (2018.01) |
| *G02B 17/06* | (2006.01) |
| *G02B 27/22* | (2018.01) |

(52) U.S. Cl.
CPC .......... *G02B 27/2292* (2013.01); *B60K 37/02* (2013.01); *F21S 43/31* (2018.01); *F21V 7/0033* (2013.01); *F21V 7/04* (2013.01); *G02B 17/0605* (2013.01); *B60K 2350/1072* (2013.01); *B60K 2350/2017* (2013.01); *B60K 2350/2056* (2013.01); *B60K 2350/2065* (2013.01)

(58) Field of Classification Search
CPC ... G02B 27/2292; G02B 17/0605; F21V 7/04; F21V 7/0033; F21S 48/234; F21S 43/31; B60K 37/02
See application file for complete search history.

(56) References Cited

U.S. PATENT DOCUMENTS

2016/0009233 A1\* 1/2016 Lund ..................... F21S 43/237
                                                                362/511

\* cited by examiner

*Primary Examiner* — Thomas M Sember
(74) *Attorney, Agent, or Firm* — Quinn IP Law

(57) ABSTRACT

Disclosed herein are devices, methods and systems for producing hologram-based indicia for a vehicle dashboard/cockpit. By employing the aspects disclosed herein, indicia (electronically coupled to the vehicle's microprocessor), is lighted and projected in a three-dimensional virtual manner. The aspects disclosed herein may be embedded in various portions in the vehicle and thus, not consume extra space or area required to create virtual images through other techniques.

20 Claims, 6 Drawing Sheets

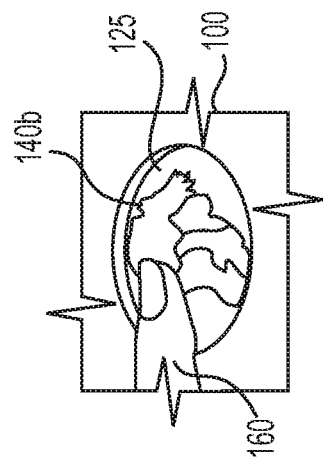
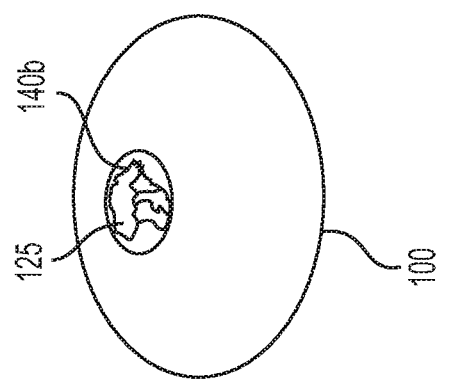
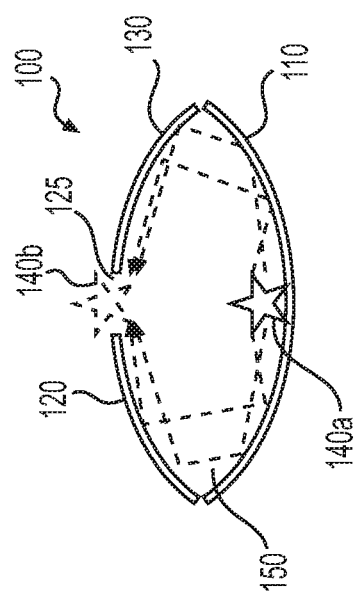
FIG. 1A PRIOR ART
FIG. 1B PRIOR ART
FIG. 1C PRIOR ART

DASHBOARD EMBEDDED HOLOGRAM-BASED INDICIA

BACKGROUND

Conventionally, in implementing information to a driver or occupant of a vehicle, mechanical indicia were used. This commonly was implemented with motors driving pointers, with the pointer indicating to a static gauge corresponding to a sensed status of the vehicle.

Another conventional display is the digital display. Static light was employed to light up an indicia based on a detected status or indication. For example, in situations where fuel is low, the speed of the vehicle is over a predetermined threshold, or if the driver/occupant is not wearing a seat belt.

Current indicia is depicted in two-dimensional representations via a digital display, or through a mechanical element, such as a pointer and the like.

FIGS. 1(a)-(c) illustrates a mirascope 100 according to a prior art implementation. In FIG. 1(a), a cross-sectional view of the mirascope 100 is depicted.

As shown in FIG. 1(a), two concave mirrors 110 and 120/130 (with aperture 125) are placed together, with the concave portions facing each other. The upper concave mirror, includes a first part 120, including an aperture 125.

As shown, an object 140a is placed on the bottom mirror 110. The object 140a, when lighted, reflects light 150 of all the surfaces of the bottom mirror 110, and the top mirror 120. This produces an effect of a three-dimensional real image 140b.

This effect is shown in greater detail with regards to FIGS. 1(b) and (c). As shown in FIG. 1(b), a three-dimensional image 140b of a frog is shown. In FIG. 1(c), a finger 160 is shown to indicate that in the aperture 125, there image is not tangible.

SUMMARY

The following description relates to providing a system, method, and device for dashboard embedded hologram-based indicia. Exemplary embodiments may also be directed to any of the system, the method, or an application disclosed herein, and the subsequent implementation in a vehicle.

The aspects disclosed herein are directed to a vehicle cockpit of a vehicle with an embedded hologram-based indicia. The vehicle cockpit includes a dashboard of the vehicle; a first concave mirror, with a concave surface facing the front window, and having a lighted indicia representative of a state of the vehicle; and a second concave mirror, with a concave surface facing the first concave mirror and an aperture. The second concave mirror and the first concave mirror embedded on the dashboard, in response to the lighted indicia being lighted, rendering a virtual three-dimensional virtual image through the aperture Additional features of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which:

FIGS. 1(a)-(c) illustrates a concept of mirascope presentation according to a prior art implementation;

DETAILED DESCRIPTION

Figure 2A:
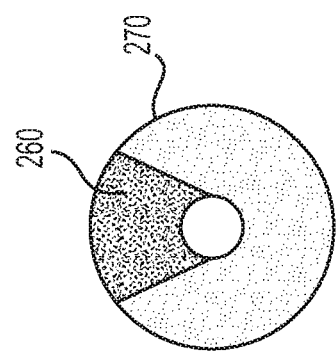
FIGS. 2(a) and (b) illustrate examples of a mirascope-based indicia modified for vehicular application.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Vehicle-based indicia have traditionally been either mechanical in nature and look, or a two-dimensional display. Thus, existing techniques fail to incorporate both a three-dimensional look and feel, while employing the advantages of digital information.

Disclosed herein are implementations to provide a dashboard embedded hologram-based indicia(s). By employing the aspects disclosed herein, vehicular cockpits may be more aesthetically pleasing, employ additional areas not previously utilized, and incorporate a wholly new way of presenting content to a driver and/or occupant of a vehicle.

FIGS. 2(a) and (b) illustrate an example of a vehicle-based indicia 200 employing the aspects disclosed herein. The indica 210 is placed in a cavity 201 (which is shown in various locations according to embodiments disclosed herein in FIGS. 3 and 5). The indicia 210 may be any sign or signal commonly implemented in a vehicle-based cockpit system (for example, a turn light, seat belt indicator, check engine, low fuel, or the like).

Figure 2B:
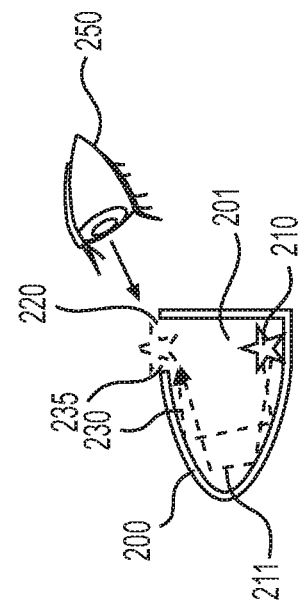

The concave mirrors 230 are shown as semicircular, and approximately half of the size of the device shown in FIGS. 1(a)-(c). FIG. 2(b) illustrates this phenomena. The driver or occupant is primarily viewing the indicia from one-side (area 260). As such, a fully concave system (such as those described in the background) need not be implemented, as the shown in FIG. 2(b) with ignored portions 270. Thus, this allows the embedded mirascope to be smaller, with volume being effectively saved in an implementation in a dashboard.

The indicia 210, when lighted, is reflected via optical path 211, and appears as a three-dimensional virtual object 220 (or hologram) via the aperture 235, as seen by eyes 250. This indicia 210 may be a three-dimensionally lettering/graphics/numbers with the message intended to be displayed to the viewer's eyes 250.

Figure 3:
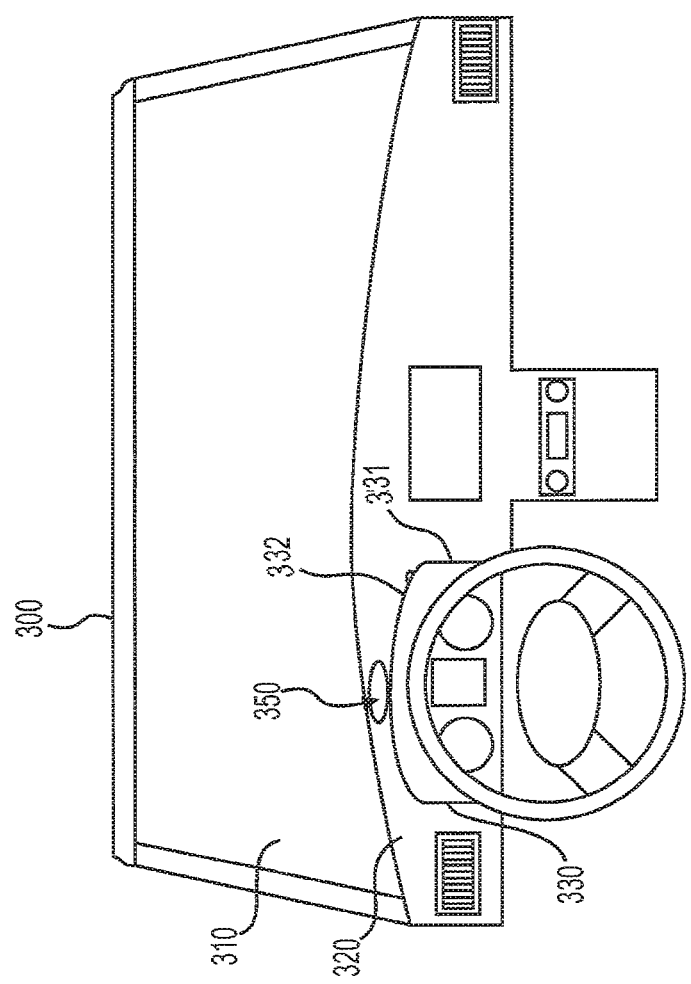
FIG. 3 illustrates a cockpit of a vehicle from a front driver perspective incorporating one exemplary an implementation of a mirascope disposed in a dashboard of the cockpit of the vehicle according to the aspects disclosed herein.
Figure 4:
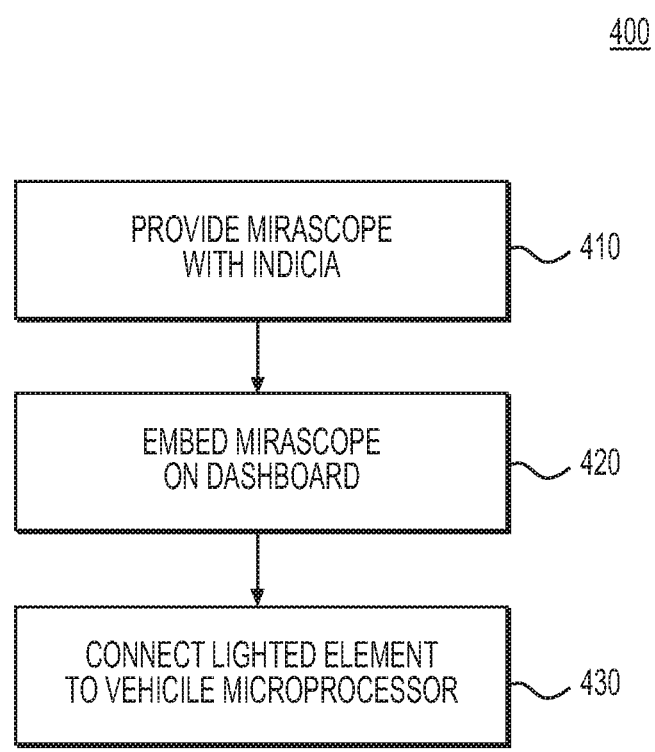
FIG. 4 illustrates a method of implementing the embodiment shown in FIG. 3.

FIG. 3 illustrates a first embodiment of the aspects disclosed herein in a vehicle 300, with FIG. 4 illustrating a method 400 for implementation. The vehicle 300 shown in FIG. 3 is shown from a front driver perspective. Thus, the windshield 310 is provided as in front of the driver/occupant.

Also provided is an instrument cluster 330. An instrument cluster 330 is a standard display system, provided behind a steering wheel that displays critical information about the operation of the vehicle 300. The instrument cluster 330 includes a display 331 and a hood 332 that shields the display 331 from effects of the environment (such as sunlight).

The vehicle 300 also includes a dashboard 320, which extends along the width portion of the front of the vehicle 300, and is generally perpendicular to the front window 310 (compensating for an angle in which the front window 310 is disposed).

Now referring to FIG. 4, the method 400 of implementing the structure in FIG. 3 will be described. In operation 410, a mirascope 350 is provided similar to what was shown in FIG. 2 (as to implementing the aspects disclosed herein). Only one mirascope 350 is shown, however, multiple mirascopes may be implemented depending on an implementer's preference.

In operation 420, a dashboard is manufactured to allow the mirascope of operation 410 to be embedded in the dashboard. The placement and the number of mirascopes in the dashboard of the cockpit of the vehicle shown in FIG. 3 is for exemplary purposes. It is understood that the placement and number of mirascopes in the dashboard of the cockpit of the vehicle may be modified.

In operation 430, the indicia in the mirascope is electrically connected to the vehicle or instrument cluster's microprocessor, with the ability to receive instructions or signals associated with said function of which the indicia corresponds to. For example, if the indicia is related to breaking, the mirascope is electrically connected (either through wired or wireless connection) to a signal that instructs said mirascope to produce a three-dimensional virtual image based on command.

Figure 5:
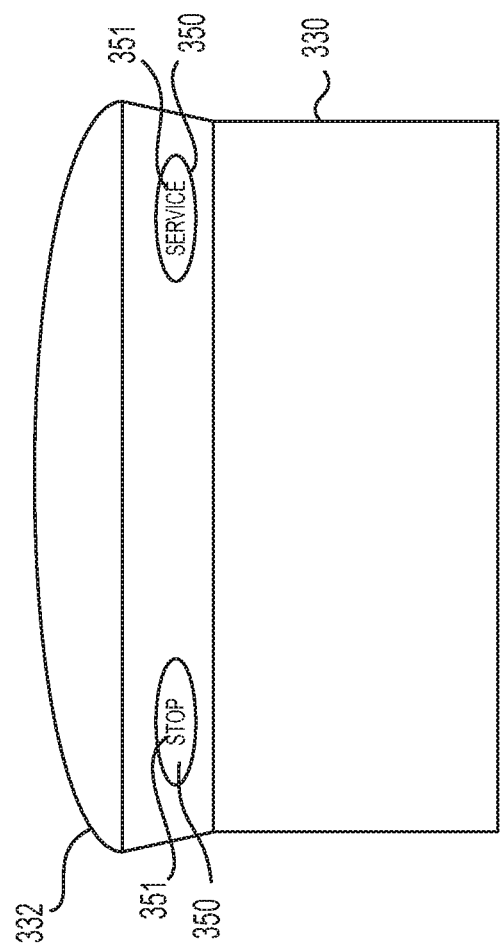
FIG. 5 illustrates an instrument cluster of a vehicle incorporating one exemplary implementation of a second mirascope according to the aspects disclosed herein.

FIG. 5 illustrates a second embodiment of the aspects disclosed herein. As shown in FIG. 5, a close-up of an instrument cluster 330 is shown. As shown, the mirascopes 350 are now embedded on the instrument cluster hood 332, and specifically the bottom portion that extends significantly perpendicular to the instrument cluster display 330. The mirascopes 350 are configured to generate a three-dimensional virtual object (or hologram) 351 of a sign or signal commonly implemented in a vehicle-based cockpit system. The mirascopes 350 are electrically connected to the instrument cluster 330 and produce a three-dimensional virtual image based on commands received from the microprocessor of the instrument cluster 330.

Figure 6:
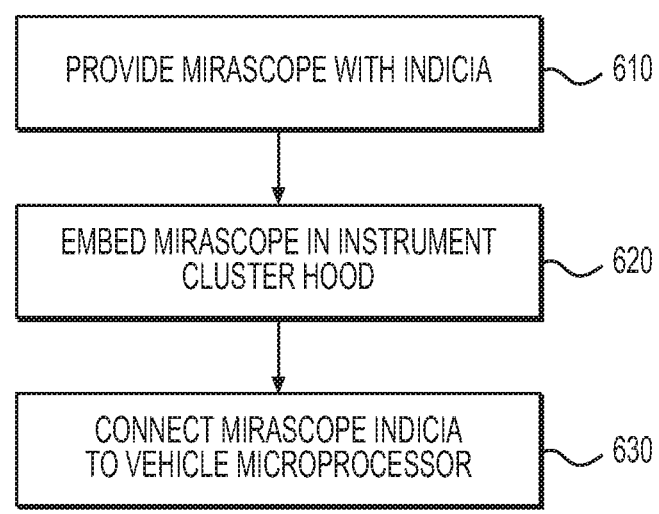
FIG. 6 illustrate a method of implementing the embodiment shown in FIG. 5.

FIG. 6 illustrates a method 600 for implementing the structure shown in FIG. 5. The operations of 610 and 630 of the method illustrated in FIG. 6 correspond significantly to operations 410 and 430 of the method illustrated in FIG. 4. The chief difference between the method 600 in FIG. 6 and the method 400 in FIG. 4 is that in operation 620, an instrument cluster hood (or cluster cap) is manufactured to allow a mirascope according to FIG. 2 to be embedded therein.

The embodiments shown in FIGS. 3 and 5 may be implemented individually, or together. Thus, employing the aspects disclosed herein, vehicle-based cockpits may incorporate a unique method of providing three-dimensional holograms in the existing dashboards and/or instrument clusters.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A cockpit disposed adjacent a front window of a vehicle comprising:
   a dashboard extending along and adjacent to the front window, wherein the dashboard is positioned generally perpendicular to the front window;
   an instrument cluster cooperating with the dashboard, wherein the instrument cluster includes a display and a hood cooperating with the display; and
   at least one mirascope disposed in the dashboard adjacent to the instrument cluster to generate hologram-based indicia, wherein the at least one mirascope includes:
   a first partially concave mirror having a concave surface facing the front window,
   a second partially concave mirror having a concave surface facing the first partially concave mirror cooperating with the concave surface of the first partially concave mirror to define a cavity therebetween,
   an aperture defined between the first partially concave mirror and the second partially concave mirror and cooperating with the cavity defined in the at least one mirascope, and
   one or more indicia positioned in the cavity,
   wherein
   in response to the one or more indicia being lighted, the first partially concave mirror and second partially concave mirror cooperate to reflect the one or more indicia through the aperture to render a virtual three-dimensional virtual image.

2. The cockpit according to claim 1, wherein the dashboard includes a surface, the surface opposing the front window of the vehicle, wherein the second partially concave mirror and the first partially concave mirror of the at least one mirascope are embedded on the surface of the dashboard.

3. The cockpit according to claim 1, wherein the first partially concave mirror and the second partially concave mirror of the at least one mirascope are semi-circular.

4. The cockpit according to claim 1, wherein the hood of the instrument cluster cooperates with the display to shield the display from environmental effects.

5. The cockpit according to claim 1, wherein the one or more indicia may be a three-dimensional object containing one or more letters, graphics and numbers.

6. The cockpit according to claim 1, wherein the one or more indicia may be a three-dimensional message containing one or more letters, graphics and numbers.

7. The cockpit according to claim 1, wherein the instrument cluster further comprises a microprocessor in electrical communication with the at least one mirascope, wherein the microprocessor is configured to receive instructions or signals associated with functions of the vehicle and instruct the at least one mirascope to produce a three-dimensional virtual image in response to the signals associated with functions of the vehicle.

8. A cockpit disposed adjacent a front window of a vehicle comprising:
  a dashboard extending along and adjacent to the front window, wherein the dashboard is positioned generally perpendicular to the front window;
  an instrument cluster cooperating with the dashboard, wherein the instrument cluster includes a display and a hood cooperating with the display; and
  at least one mirascope disposed on the instrument cluster hood to generate hologram-based indicia, wherein the at least one mirascope includes:
    a first partially concave mirror having a concave surface facing the front window,
    a second partially concave mirror having a concave surface facing the first partially concave mirror cooperating with the concave surface of the first partially concave mirror to define a cavity therebetween,
    an aperture defined between the first partially concave mirror and the second partially concave mirror and cooperating with the cavity defined in the at least one mirascope, and
    one or more indicia positioned in the cavity,
  wherein in response to the one or more indicia being lighted, the first partially concave mirror and second partially concave mirror cooperate to reflect the one or more indicia through the aperture to render a virtual three-dimensional virtual image.

9. The cockpit according to claim 8, wherein the instrument cluster further comprises an instrument cluster cap, wherein the instrument cluster cap includes a surface opposing the front window of the vehicle, wherein the second partially concave mirror and the first partially concave mirror of the at least one mirascope are embedded on the surface of the instrument cluster cap.

10. The cockpit according to claim 8, wherein the first partially concave mirror and the second partially concave mirror of the at least one mirascope are semi-circular.

11. The cockpit according to claim 8, wherein the hood of the instrument cluster cooperates with the display to shield the display from environmental effects.

12. The cockpit according to claim 8, wherein the one or more indicia may be a three-dimensional object containing one or more letters, graphics and numbers.

13. The cockpit according to claim 8, wherein the one or more indicia may be a three-dimensional message containing one or more letters, graphics and numbers.

14. The cockpit according to claim 8, wherein the instrument cluster further comprises a microprocessor in electrical communication with the at least one mirascope, wherein the microprocessor is configured to receive instructions or signals associated with functions of the vehicle and instruct the at least one mirascope to produce a three-dimensional virtual image in response to the signals associated with functions of the vehicle.

15. A cockpit disposed adjacent a front window of a vehicle comprising:
  a dashboard extending along and adjacent to the front window, wherein the dashboard is positioned generally perpendicular to the front window;
  an instrument cluster cooperating with the dashboard, wherein the instrument cluster includes a display, a hood cooperating with the display and a microprocessor; and
  at least one mirascope disposed in the dashboard adjacent to the instrument cluster to generate hologram-based indicia, wherein the at least one mirascope is in electrical communication with the microprocessor of the instrument cluster, the at least one mirascope includes:
    a first partially concave mirror having a concave surface facing the front window,
    a second partially concave mirror having a concave surface facing the first partially concave mirror cooperating with the concave surface of the first partially concave mirror to define a cavity therebetween,
    an aperture defined between the first partially concave mirror and the second partially concave mirror and cooperating with the cavity defined in the at least one mirascope, and
    one or more indicia positioned in the cavity,
  wherein in response to the one or more indicia being lighted, the first partially concave mirror and second partially concave mirror cooperate to reflect the lighted one or more indicia through the aperture to render a virtual three-dimensional virtual image.

16. The cockpit according to claim 15, wherein the microprocessor is configured to receive instructions or signals associated with functions of the vehicle and instruct the at least one mirascope to produce a three-dimensional virtual image in response to the signals associated with functions of the vehicle.

17. The cockpit according to claim 15, wherein the one or more indicia may be a three-dimensional object containing one or more letters, graphics and numbers.

18. The cockpit according to claim 15, wherein the one or more indicia may be a three-dimensional message containing one or more letters, graphics and numbers.

19. The cockpit according to claim 15, wherein the dashboard includes a surface, the surface opposing the front window of the vehicle, wherein the second partially concave mirror and the first partially concave mirror of the at least one mirascope are embedded on the surface of the dashboard.

20. The cockpit according to claim 15, wherein the first partially concave mirror and the second partially concave mirror of the at least one mirascope are semi-circular.

* * * * *